(12) United States Patent
Tada

(10) Patent No.: US 7,142,776 B2
(45) Date of Patent: Nov. 28, 2006

(54) APPARATUS FOR RECORDING AND REPRODUCING INFORMATION WITH RING BUFFER

(75) Inventor: Kenichiro Tada, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 1109 days.

(21) Appl. No.: 09/999,194

(22) Filed: Dec. 3, 2001

(65) Prior Publication Data

US 2002/0172497 A1    Nov. 21, 2002

(30) Foreign Application Priority Data

Dec. 4, 2000    (JP)    ............................... 2000-367979

(51) Int. Cl.
*H04N 5/91*    (2006.01)

(52) U.S. Cl. ........................................................ 386/68

(58) Field of Classification Search .................... 386/1, 386/45, 52, 68, 70, 72, 82, 92, 95, 106, 112, 386/125, 126
See application file for complete search history.

(56) References Cited

U.S. PATENT DOCUMENTS 5,999,691 A * 12/1999 Takagi et al. .................. 386/46

* cited by examiner

*Primary Examiner*—Thai Tran
*Assistant Examiner*—Mishawn Dunn
(74) *Attorney, Agent, or Firm*—Drinker Biddle & Reath LLP

(57) ABSTRACT

An apparatus for recording and reproducing information with a ring buffer is able to prevent an overwrite onto a scheduled reproducing portion during the time shift reproduction. When a current reproducing position in the ring buffer is precedent to a current recording position and a recording speed at the present point of time is higher than a reproducing speed, the reproducing speed is raised forcibly.

5 Claims, 4 Drawing Sheets

FIG. 4

PORTION TO BE REPRODUCED SUBSEQUENTLY WILL BE OVERWRITTEN IN "N" MINUTES BY THE PROGRAM BEING RECEIVED!

US 7,142,776 B2

APPARATUS FOR RECORDING AND REPRODUCING INFORMATION WITH RING BUFFER

BACKGROUND OF THE INVENTION

1. Field of the Invention

The invention relates to an apparatus for recording and reproducing information with a ring buffer for recording and reproducing video signals by using its area circularly.

2. Description of Related Art

In recent years, hard disk recorders are attracting a great attention as a recording device in which a program provided by television broadcast or the like is recorded onto a hard disk instead of a video tape. When a hard disk is used as a recording medium, for example, while the program which is broadcast is being recorded, the recorded program can be simultaneously reproduced (hereinafter, referred to as a time shift reproduction). A ring buffer area is provided in the hard disk in order to realize the time shift reproduction.

FIG. 1 is a diagram for explaining the recording and reproducing operations in the ring buffer area when performing the time shift reproduction.

In FIG. 1, a write position WP indicates a present recording position in the ring buffer area and a read position RP indicates a present reproducing position in the ring buffer area. Those positions WP and RP move gradually from a head position to a last position of the ring buffer area independently, as shown by blank arrows in FIG. 1 respectively. When each of the positions WP and RP reaches the last position, the position returns to the head position and again gradually moves toward the last position. That is, in the ring buffer area, the continuous recording and reproducing operations in a range from the head to the last of the area are independently executed, and the operations are repeated circularly in the ring-buffer area. The speed at which each of the positions WP and RP moves depends on a bit rate of a video signal of a broadcast program selected as a target of recording or reproduction.

By the operations described above, at the time of the time shift reproduction, the recorded broadcast program is reproduced from the position RP while the broadcast program provided by the television broadcast is being recorded to the position WP in the ring buffer area.

In the digital broadcast channel, broadcast programs of different bit rates such as HDTV (High Definition Television) broadcast programs of high picture quality and SDTV (Standard Definition Television) broadcast programs of standard picture quality exist mixedly. Therefore, while an HDTV broadcast program of the high bit rate is being recorded, if an SDTV broadcast program of the low bit rate is reproduced in a state where the write position WP and the read position RP are close to each other as shown in FIG. 1, a state such that the WP outruns the RP occurs. If the write position WP outruns the read position RP, a portion (the SDTV broadcast program) to be reproduced will be overwritten progressively by the contents of the HDTV broadcast program.

OBJECTS AND SUMMARY OF THE INVENTION

The invention has been made to solve the problem mentioned above and it is an object of the invention to provide an information recording and reproducing apparatus with a ring buffer which can prevent an overwriting onto a not-yet reproduced portion at the time of a time shift reproduction.

According to the invention, there is provided an apparatus for recording and reproducing information with a ring buffer for recording a video signal which is supplied as time elapses, comprising: a recording and reproducing unit for reproducing the recording signal recorded in the ring buffer while continuously recording the video signal from a head position to a last position of the ring buffer; a recording and reproducing position information obtaining part for obtaining information showing each of a current recording position and a current reproducing position in the ring buffer; and a reproducing speed adjusting part for adjusting a reproducing speed so as to raise it when the current reproducing position is precedent to the current recording position and a recording speed of the video signal by the recording and reproducing part is higher than a reproducing speed.

BRIEF DESCRIPTION OF THE DRAWINGS

FIG. 4 is a diagram showing an example of an overwrite predictive message display.

DETAILED DESCRIPTION OF THE PREFERRED EMBODIMENTS

An embodiment of the invention will now be described in detail below with reference to the drawings.

Figure 2:
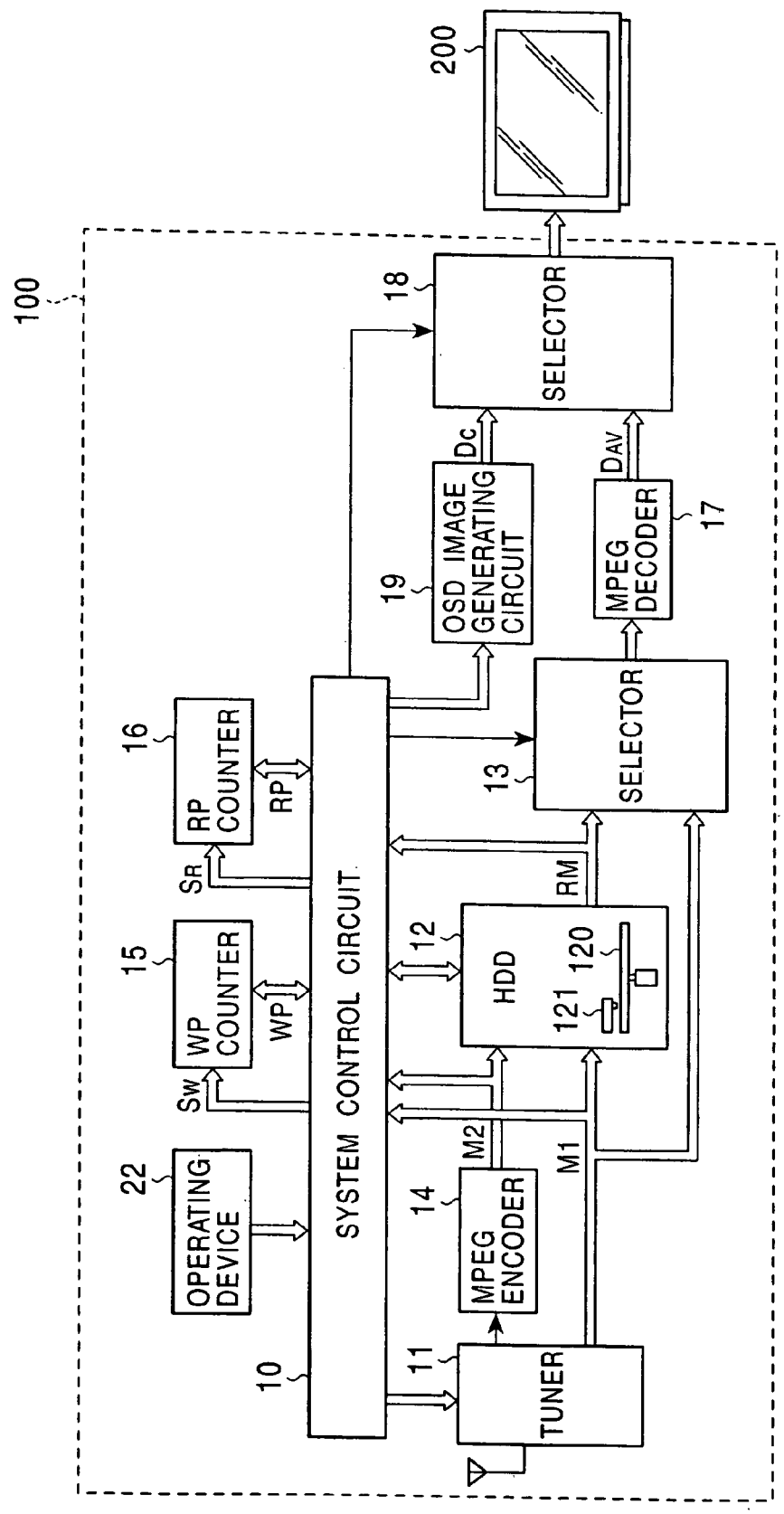
FIG. 2 is a diagram showing an internal construction of an information recording and reproducing apparatus 100 according to the invention.

FIG. 2 is a diagram showing the construction of an information recording and reproducing apparatus 100 according to the invention.

In FIG. 2, the information recording and reproducing apparatus 100 includes a tuner 11 controlled by a system control circuit 10. When a channel designation signal of digital broadcast is supplied from the system control circuit 10, the tuner 11 receives a digital broadcast wave of the designated channel. In this state, the tuner 11 obtains an MPEG (Moving Picture Experts Group) signal by demodulating the received digital broadcast wave and supplies it to each of a hard disk drive (HDD) 12 and a selector 13 as an MPEG signal M1. When the channel designation signal of an analog television broadcast (NTSC system, PAL system, or SECAM system) is supplied from the system control circuit 10, the tuner 11 receives an analog television broadcast wave of the designated channel. In this state, the tuner 11 supplies a television signal obtained by demodulating the received analog television broadcast wave to an MPEG encoder 14. The MPEG encoder 14 supplies a signal obtained by performing an MPEG encoding process to the television signal as an MPEG signal M2 to the hard disk drive 12.

A recording and reproducing head 121 of the hard disk drive 12 records the MPEG signal M1 or M2 into a ring buffer area of a hard disk 120 in response to a recording command signal supplied from the system control circuit 10. In this state, the system control circuit 10 supplies a count start command for starting the counting operation to a write position counter 15 and supplies a current count value to the HDD 12 as a write position WP for designating a recording position in the ring buffer area. Further, the system control circuit 10 supplies a recording speed signal $S_W$ for designating a recording speed according to the bit rate of the MPEG signal M1 or M2 to be recorded to the write position counter 15 described above. The write position counter 15, thus, executes counting-up at a speed according to the recording speed signal $S_W$.

Figure 1:
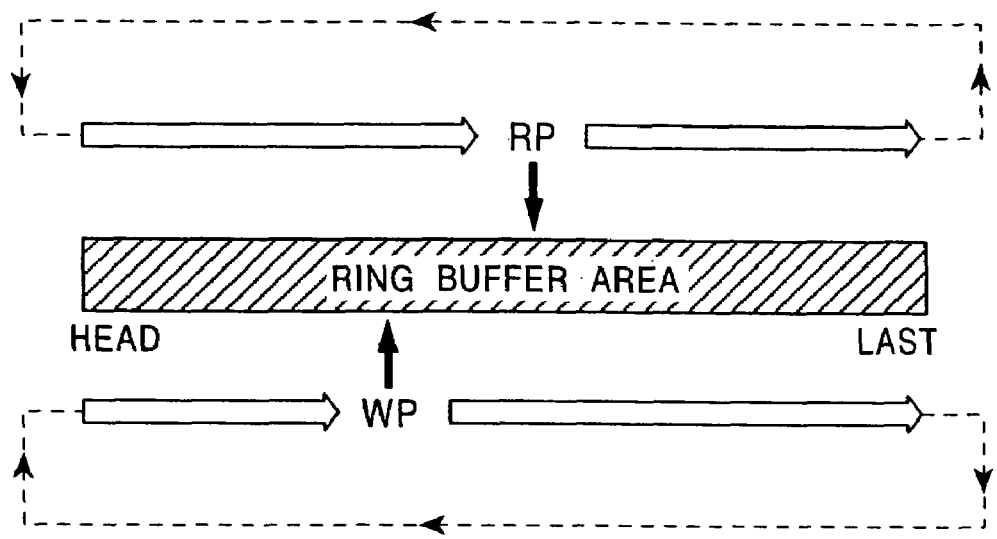
FIG. 1 is a diagram for explaining the recording and reproducing operations in a ring buffer area upon time shift reproduction.

The recording and reproducing head 121, therefore, records the MPEG signal M1 or M2 carrying the broadcast program received by the tuner 11 to a position indicated by the write position WP in the ring buffer area as shown in FIG. 1. Since the write position WP changes at a speed according to the recording speed signal $S_W$, the recording and reproducing head 121 records the MPEG signal M1 or M2 into the ring buffer area at the recording speed designated by the recording speed signal $S_W$.

In response to a reproduction command signal supplied from the system control circuit 10, the recording and reproducing head 121 reads out the recording signal recorded in the ring buffer area on the hard disk 120 as shown in FIG. 1 and supplies it as a reproduction MPEG signal RM to the selector 13. In this state, the system control circuit 10 supplies the count start command to start the counting operation to a read position counter 16 and supplies a present count value to the HDD 12 as a read position RP for designating a read position in the ring buffer area. The system control circuit 10 further generates a reproducing speed signal $S_R$ for designating a reproducing speed according to a bit rate of the reproduction MPEG signal RM reproduced from the ring buffer area and supplies it to the read position counter 16. The read position counter 16, thus, executes the count-up operation at a speed according to the reproducing speed signal $S_R$.

The recording and reproducing head 121, therefore, obtains the reproduction MPEG signal RM by reading the recording information from the position indicated by the read position RP in the ring buffer area as shown in FIG. 1. Since the read position RP changes according to a speed corresponding to the reproducing speed signal $S_R$ the recording and reproducing head 121 sequentially reads the recording signal from the ring buffer area at a reproducing speed designated by the reproducing speed signal $S_R$.

Between the reproduction MPEG signal RM supplied from the HDD 12 and the MPEG signal M1 supplied from the tuner 11, the selector 13 alternatively selects the signal corresponding to a selection signal supplied from the system control circuit 10 and supplies it to an MPEG decoder 17. The MPEG decoder 17 performs an MPEG decoding process to the MPEG signal supplied from the selector 13, thereby obtaining the video signal, and supplies it as a video signal $D_{AV}$ to a selector 18.

An OSD (On Screen Display) image generating circuit 19 generates a message image signal $D_C$ for displaying an image according to various message display commands supplied from the system control circuit 10 and supplies it to the selector 18.

Between the video signal $D_{AV}$ and the message image signal $D_C$, the selector 18 alternatively selects the signal according to the selection signal supplied from the system control circuit 10 and supplies it to a display device 200. The display device 200 displays the image based on the video signal $D_{AV}$ or the message image signal $D_C$ supplied from the information recording and reproducing apparatus 100.

An operating device 22 receives user's various operations such as broadcast channel designating operation, recorded program designating operation, recording command operation, reproducing command operation, recording stop operation, reproducing stop operation, and the like, and supplies various operation signals according to those operations to the system control circuit 10. It is also possible to use a remote controller provided separately outside the casing of the information recording and reproducing apparatus 100 as the operating device 22.

The operation (TV monitor, recording, time shift reproduction) of the information recording and reproducing apparatus 100 which is executed by the system control circuit 10 in accordance with various operations which are executed by the user by using the operating device 22 will be described below.

(1) Television Monitoring Operation

When monitoring in real time a program which is being broadcast, the user executes the broadcast channel designating operation to designate a desired broadcast channel by using the operating device 22. In accordance with the operation, the system control circuit 10 supplies to the tuner 11 a channel designation signal for allowing the program of the desired broadcast channel to be received. At the same time, the system control circuit 10 supplies to the selector 13 a selection signal for alternatively transferring the MPEG signal M1 generated from the tuner 11 to the MPEG decoder 17. The system control circuit 10 further supplies to the selector 18 a selection signal for alternatively transferring the audio signal $D_{AV}$ generated from the MPEG decoder 17 to the display device 200.

The MPEG signal M1 obtained by receiving and demodulating by the tuner 11 by the above-described control operations is supplied to the MPEG decoder 17 through the selector 13. The audio signal $D_{AV}$ decoded by the MPEG decoder 17 is supplied to the display device 200 through the selector 18. The display device 200, thus, displays an image of the digital broadcast program of the desired channel received by the tuner 11 in real time.

(2) Recording Operation

When the program received by the tuner 11 as mentioned above is recorded, the user executes the recording command operation by using the operating device 22. In accordance with the recording command operation, the system control circuit 10 supplies a recording command signal to the hard disk drive 12, reads the present count value of the write position counter 15, and supplies it as a write position WP to the HDD 12. The system control circuit 10 further obtains the recording speed signal $S_W$ according to the bit rate of the MPEG signal M1 or M2 obtained by receiving by the tuner 11, allows it to be stored into a built-in register (not shown), and supplies it to the write position counter 15. The HDD 12, thus, sequentially records the MPEG signal M1 or M2 from the position in the ring buffer area shown by the write position WP at a speed according to the recording speed signal $S_W$.

(3) Time Shift Reproducing Operation

In case of executing what is called time shift reproduction for simultaneously performing the reproduction of the recorded program during the recording operation, the user executes the reproducing command operation and the recorded program designating operation by using the operating device 22. In accordance with these operations, the system control circuit 10 executes a control process according to the time shift reproduction control routine depicted in FIG. 3.

Figure 3:
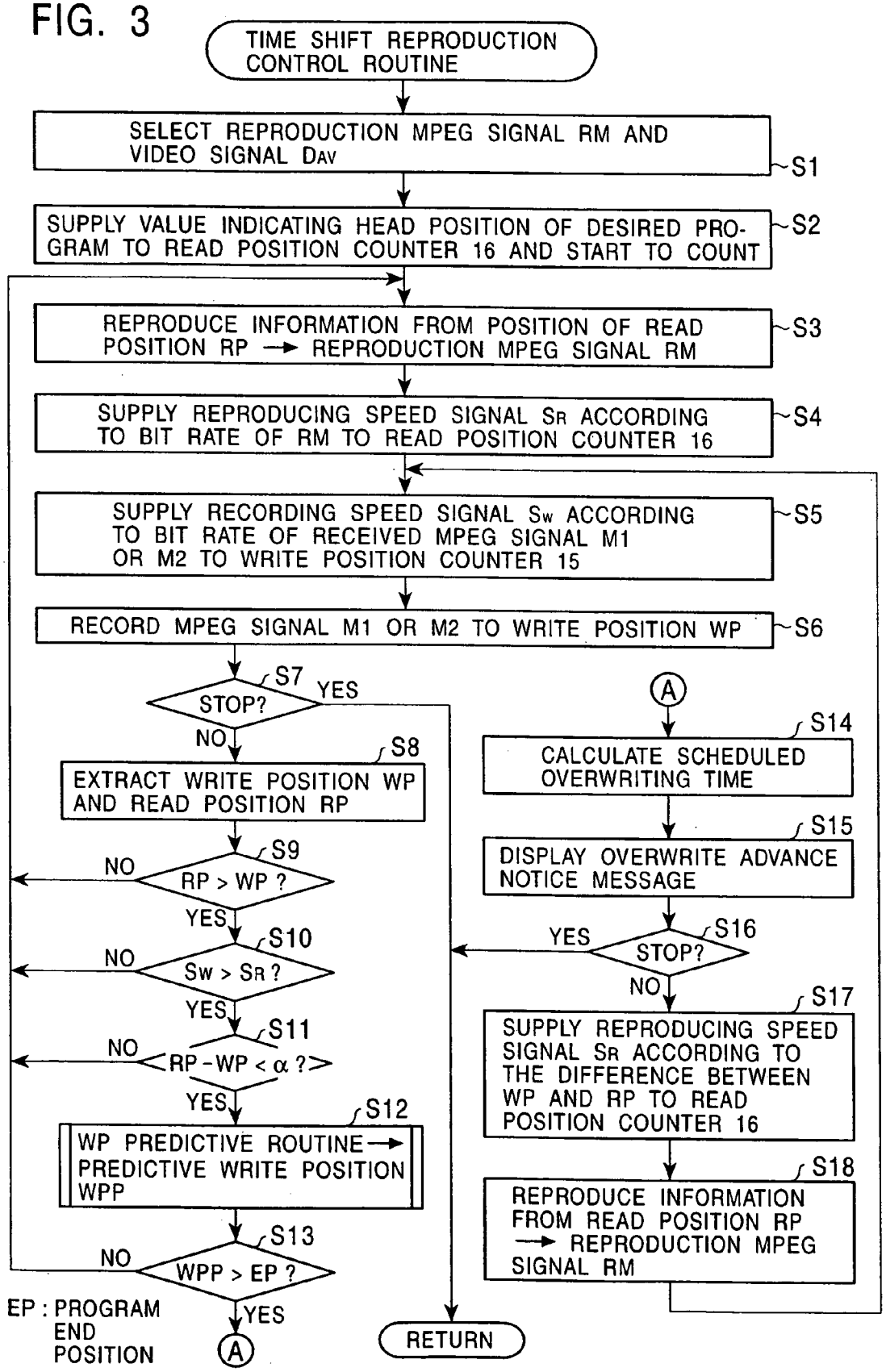
FIG. 3 is a diagram showing a time shift reproduction control routine.

In FIG. 3, the system control circuit 10 first transfers the reproduction MPEG signal RM generated from the HDD 12 to the MPEG decoder 17 and supplies a selection signal for allowing the video signal $D_{AV}$ generated from the MPEG decoder 17 to be transmitted to the display device 200 to each of the selectors 13 and 18 (step S1). Subsequently, the system control circuit 10 supplies a value indicating the head position of the desired program designated by the recorded program designating operation of the user to the read position counter 16 together with the count start command (step S2). The read position counter 16, thus, retrieves the value showing the head position of the desired program as an initial count value and starts the count-up operation from the above value. Subsequently, the system control circuit 10 supplies a reproduction command signal to the HDD 12, retrieves the present count value of the read position counter 16 as a read position RP, and supplies it to the HDD 12 (step S3). The recording and reproducing head 121 of the HDD 12, thus, reads the information from the position in the ring buffer area shown by the read position RP and supplies the obtained the reproduction MPEG signal RM to the selector 13. At this time, the reproduction MPEG signal RM is transferred to the MPEG decoder 17 through the selector 13 and decoded to the video signal $D_{AV}$ generated by the MPEG decoder 17. The video signal $D_{AV}$ is transmitted to the display device 200 through the selector 18 and the desired program is reproduced and displayed. Subsequently, the system control circuit 10 obtains the reproducing speed signal $C_R$ for designating a reproducing speed according to the bit rate of the reproduction MPEG signal RM and supplies it to the read position counter 16 (step S4). The read position counter 16 is, consequently, set so as to perform the count-up operation at a speed according to the reproducing speed signal $S_R$.

Subsequently, the system control circuit 10 supplies a recording command signal to the HDD 12, retrieves the present count value of the write position counter 15, and supplies it as a write position WP to the HDD 12 (step S5). The system control circuit 10 obtains the recording speed signal $S_W$ for designating a recording speed according to the bit rate of the MPEG signal M1 or M2 obtained by the reception at the tuner 11, allows it to be stored into the built-in register, and supplies it to the write position counter 15 (step S6). The HDD 12, consequently, sequentially records the MPEG signal M1 or M2 carrying the received broadcast program from the position in the ring buffer area indicated by the write position WP at a speed according to the recording speed signal $S_W$.

That is, by the series of operations in steps S3 to S6, the apparatus executes what is called time shift reproduction such that the recorded program is reproduced while performing the program recording.

Subsequently, the system control circuit 10 discriminates whether or not the user has executed the reproduction stop operation or the recording stop operation by using the operating device 22 (step S7). In step S7, if it is determined that either the reproduction stop operation or the recording stop operation has been performed, the system control circuit 10 exits from the time shift reproduction control routine and starts to execute a main routine (not shown). In step S7, if it is determined that neither the reproduction stop operation nor the recording stop operation is performed, the system control circuit 10 retrieves the present count values of the write position counter 15 and read position counter 16 as a write position WP and a read position RP and allows them to be stored into the built-in register (step S8). Subsequently, the system control circuit 10 discriminates whether the read position RP is larger than the write position WP or not (step S9). That is, in step S9, whether the reproducing position (RP) at the present point of time is precedent to the recording position (WP) in the ring buffer area as shown in FIG. 1 or not is discriminated. In step S9, if it is determined that the read position RP is not larger than the write position WP, the system control circuit 10 is returned to the execution of step S3 and continues the time shift reproducing operation as mentioned above. That is, when the reproducing position at the present point of time is behind the recording position, since a fear that a portion to be reproduced from now on is overwritten is small, the time shift reproducing operation is continued as it is.

In step S9, if it is determined that the read position RP is larger than the write position WP, the system control circuit 10 subsequently discriminates whether the recording speed signal $S_W$ stored in the built-in register is larger than the reproducing speed signal $S_R$ or not (step S10). That is, as shown in FIG. 1, if the reproducing position (RP) at the present point of time is precedent to the recording position (WP), whether the recording speed is higher than the reproducing speed or not is discriminated. In step S10, if it is determined that the recording speed signal $S_W$ is not larger than the reproducing speed signal $S_R$, the system control circuit 10 returns to the execution of step S3 and continues the time shift reproducing operation as mentioned above. That is, when the recording speed is not higher than the reproducing speed, since the not-yet reproduced portion to be reproduced subsequently will not be overwritten by a new program, the time shift reproducing operation is continued as it is.

In step S10, if it is determined that the recording speed signal $S_W$ is larger than the reproducing speed signal $S_R$, the system control circuit 10 subsequently discriminates whether a difference value between the write position WP and the read position RP is smaller than a predetermined value á or not (step S11). That is, in step S11, whether a distance between the write position WP and the read position RP is relatively small or not is discriminated. In step S11, if it is determined that the difference value between the write position WP and the read position RP is equal to or larger than the predetermined value á, the system control circuit 10 is returned to the execution of step S3 and continues the time shift reproducing operation as mentioned above. That is, when the distance between the write position WP and the read position RP is relatively large, there remains a long time until the not-yet reproduced portion to be reproduced subsequently is overwritten by a new program, the time shift reproducing operation is continued as it is.

In step S11, if it is determined that the difference value between the write position WP and the read position RP is smaller than the predetermined value á, the system control circuit 10 is shifted to the execution of a WP predicting routine as will be explained hereinlater (step S12). In the WP predicting routine, the system control circuit 10 obtains the write position WP at a point of time when the reproduction of the program which is at present being reproduced has been finished on the basis of the recording speed signal $S_W$ and stores it as a predictive write position WPP into the built-in register. Subsequently, the system control circuit 10 discriminates whether or not the predictive write position WPP is larger than a program end position EP indicative of the last position of the program which is at present being reproduced (step 13). In step S13, if it is decided that the predictive write position WPP is not larger than a program end position EP, the system control circuit 10 returns to the execution of step S3 and continues the time shift reproducing operation as mentioned above. That is, if it is predicted that the reproduction of the whole program which is at present being reproduced is finished before it is overwritten by the broadcast program which is at present being received, the time shift reproducing operation is continued as it is.

In step S13, if it is decided that the predictive write position WPP is larger than a program end position EP, the system control circuit 10 obtains a scheduled overwrite time N until the overwriting is started by the following arithmetic operation (step S14).

$$N=(RP-WP)/(S_W-S_R)$$

Subsequently, the system control circuit 10 supplies a message display command for displaying an overwrite advance notice display message as shown in FIG. 4 to the OSD image generating circuit 19. That is, after the lapse of the scheduled overwrite time N, the system control circuit 10 supplies to the OSD image generating circuit 19 the message display command for notifying beforehand the user of the fact that the portion to be reproduced subsequently will be overwritten by the contents of the program which is at present being received. The system control circuit 10 further supplies a selection signal for alternatively supplying the message image signal $D_C$ generated from the OSD image generating circuit 19 to the display device 200 to the selector 18 only for a predetermined period of time (step S15). By the execution of step S15, the display device 200 performs an overwrite advance notice message display as shown in FIG. 4 for a predetermined period of time.

Subsequently, the system control circuit 10 discriminates whether or not the user has executed the reproduction stop operation or the recording stop operation by using the operating device 22 (step S16). If it is determined in step S16 that either the reproduction stop operation or the recording stop operation has been performed, the system control circuit 10 exits from the time shift reproduction control routine and starts to execute the main routine (not shown). In step S16, if it is determined that neither the reproduction stop operation nor the recording stop operation is performed, the system control circuit 10 obtains the reproducing speed signal $S_R$ for designating the reproducing speed according to the difference value between the write position WP and the read position RP and supplies it to the read position counter 16 (step S17). In this process, the smaller the difference value between the write position WP and the read position RP is, the higher reproducing speed is designated by the value of the reproducing speed signal $S_R$. The system control circuit 10 supplies the reproduction command signal to the HDD 12, and retrieves the present count value of the read position counter 16 as a new read position RP. The retrieved count value is supplied to the HDD 12 (step S18). By the execution of steps S17 and S18, the HDD 12 reads the recording signal at a higher rate than the inherent bit rate of the recording signal carrying the program which is currently being reproduced. That is, during this period of time, the HDD 12 performs a decimation of the recording signal recorded in the ring buffer area while reading it.

After the execution of step S18, the system control circuit 10 returns to the execution of step S5 and repetitively executes the operations mentioned above. That is, in this state, the time shift reproduction is executed by the series of control steps in steps S17, S18, S5, and S6.

According to the time shift reproduction control process, an adjustment to raise the reproducing speed is thus forcibly executed if it is determined that the reproducing position at the present point of time is precedent to the recording position and the current recording speed is higher than the reproducing speed. The overwriting onto the non-reproduced portion which would be caused if the write position WP outruns the read position RP is prevented.

As described in detail above, in the invention, when the program of the low bit rate is reproduced while the program of the high bit rate is being recorded, the reproducing speed is forcedly increased if there is a possibility that the portion to be reproduced subsequently is overwritten by the high bit rate program.

According to the invention, it is therefore possible to prevent an inconvenience in the reproducing operation which has been conventionally experienced when the high bit rate program is recorded in the time shift reproduction, that is, the overwriting onto the not-yet reproduced portion.

This application is based on Japanese Patent Application No. 2000-367979 which is hereby incorporated by reference.

What is claimed is:

1. An apparatus for recording and reproducing information with a ring buffer for recording a video signal which is supplied as time elapses, comprising:
   a recording and reproducing part for reproducing a recorded video signal recorded in said ring buffer while continuously recording said video signal from a head position to a last position of said ring buffer;
   a recording and reproducing position information obtaining part for obtaining information representing each of a current recording position and a current reproducing position in said ring buffer; and
   a reproducing speed adjusting part for adjusting a reproducing speed in a manner that said reproducing speed is raised when said current reproducing position is precedent to said current recording position and a recording speed of said video signal by said recording and reproducing part is higher than a reproducing speed wherein said reproducing speed adjusting part is operative to adjust said reproducing speed by an amount corresponding to a distance between said current reproducing position and said current recording position.

2. An apparatus according to claim 1, wherein said reproducing speed adjusting part performs an adjustment in which a higher reproducing speed is set as said distance between said current reproducing position and said current recording position decreases.

3. An apparatus for recording and reproducing information with a ring buffer for recording a video signal which is supplied as time elapses, comprising:
   a recording and reproducing part for reproducing a recorded video signal recorded in said ring buffer while continuously recording said video signal from a head position to a last position of said ring buffer;
   a recording and reproducing position information obtaining part for obtaining information representing each of a current recording position and a current reproducing position in said ring buffer; and
   a reproducing speed adjusting part for adjusting a reproducing speed in a manner that said reproducing speed is raised when said current reproducing position is precedent to said current recording position and a recording speed of said video signal by said recording and reproducing part is higher than a reproducing speed,
   wherein said reproducing speed adjusting part executes the adjustment of said reproducing speed only when it is predicted that said recording position reaches the last position of said reproduction target program before reproduction of a program which is a current target of reproduction is totally completed.

4. An apparatus for recording and reproducing information with a ring buffer for recording a video signal which is supplied as time elapses, comprising:
- a recording and reproducing part for reproducing a recorded video signal recorded in said ring buffer while continuously recording said video signal from a head position to a last position of said ring buffer;
- a recording and reproducing position information obtaining part for obtaining information representing each of a current recording position and a current reproducing position in said ring buffer;
- a reproducing speed adjusting part for adjusting a reproducing speed in a manner that said reproducing speed is raised when said current reproducing position is precedent to said current recording position and a recording speed of said video signal by said recording and reproducing part is higher than a reproducing speed;
- and
- an overwrite advance notice message image generating part for generating an image signal representing an overwrite advance notice message to previously notify a fact that an overwrite will occur when it is predicted that said recording position reaches a last position of said reproduction target program before reproduction of a program which is a current target of reproduction is totally completed.

5. An apparatus according to claim 4, wherein information indicating a remaining time period before a start of the overwrite is included in said overwrite advance notice message.

* * * * *